United States Patent [19]

Borkowski

[11] 3,729,072
[45] Apr. 24, 1973

[54] BRAKE ADJUSTER

[75] Inventor: Donald F. Borkowski, South Bend, Ind.

[73] Assignee: The Bendix Corporation, South Bend, Ind.

[22] Filed: Mar. 24, 1972

[21] Appl. No.: 237,778

[52] U.S. Cl. .............................. 188/196 P, 188/71.8
[51] Int. Cl. ............................................. F16d 65/52
[58] Field of Search .................... 188/196 P, 196 R, 188/71.8

[56] References Cited

UNITED STATES PATENTS

| 2,888,109 | 5/1959 | Tankersley | 188/196 P |
| 3,376,959 | 4/1968 | Holcomb et al. | 188/196 R |
| 3,542,165 | 11/1970 | Lucien | 188/196 P |

FOREIGN PATENTS OR APPLICATIONS

| 811,505 | 4/1959 | Great Britain | 188/196 R |

Primary Examiner—Duane A. Reger
Attorney—Gordon H. Chenez et al.

[57] ABSTRACT

An automatically operative brake adjuster and retract device particularly adapted for a multiple disc brake of the disc type. A fixed outer bushing threadedly engaged with a carrier member slidably contains an inner bushing loaded by a return compression spring interposed between the inner and outer bushings. A radially deformable cylinder fixed to the inner bushing slidably contains a fluid pressure actuated tapered piston having an interference or force fit therein and adapted to deform the cylinder radially outwardly under the influence of applied pressurized fluid on the piston to permit axial movement of the piston therein to the degree necessary for brake application. Brake release in response to depressurization of the piston permits the inner bushing to retract relative to the outer bushing under the influence of the compression spring thereby establishing a predetermined retract position of the cylinder and thus the piston frictionally engaged therewith.

8 Claims, 3 Drawing Figures

BRAKE ADJUSTER

BACKGROUND OF THE INVENTION

The use of disc brake adjuster mechanisms particularly in multiple disc aircraft brakes to progressively advance the retracted position of the piston to compensate for brake wear is well known as is apparent from numerous patents such as, for example, U.S. Pat. No. 3,376,959 issued Apr. 9, 1968, in the name of O. L. Holcomb, Jr., et al (common assignee). Various adjuster devices have been proposed but those of which I am aware have not been entirely satisfactory for one or more reasons which may include undue weight and/or volume, structural complexity and attendent lack of reliability as well as cost, maintenance difficulties and limited part salvageability for rebuilding purposes.

SUMMARY OF THE INVENTION

The present invention pertains to automatically operating brake adjusting apparatus adapted to compensate for progressive wear of the brake friction material and maintain brake operating clearances substantially constant.

It is an object of the present invention to provide a brake adjuster automatic in operation and characterized by relatively simple, compact and reliable structure.

It is an object of the present invention to provide brake adjusting apparatus including fluid pressure actuated piston means for energizing the brake wherein a fluid pressure actuated wedge shaped member having an interference fit with a deformable cylinder is advanced therethrough as brake wear progresses to maintain a substantially constant range of movement of the piston means between brake applied and retracted positions thereof.

It is another object of the present invention to provide brake adjusting apparatus including fluid pressure actuated spring loaded piston means movable between brake retracted and applied positions and provided with a fluid pressure responsive wedge shaped member having an interference fit in a deformable cylinder which is deformed thereby to cause a permanent elongation of the piston means to compensate for brake wear and maintain the range of travel of said piston means substantially constant between the brake retracted and applied positions.

Additional objects and advantages may become apparent with reference to the following description and accompanying drawings.

BRIEF DESCRIPTION OF THE PREFERRED EMBODIMENT

Figure 1:
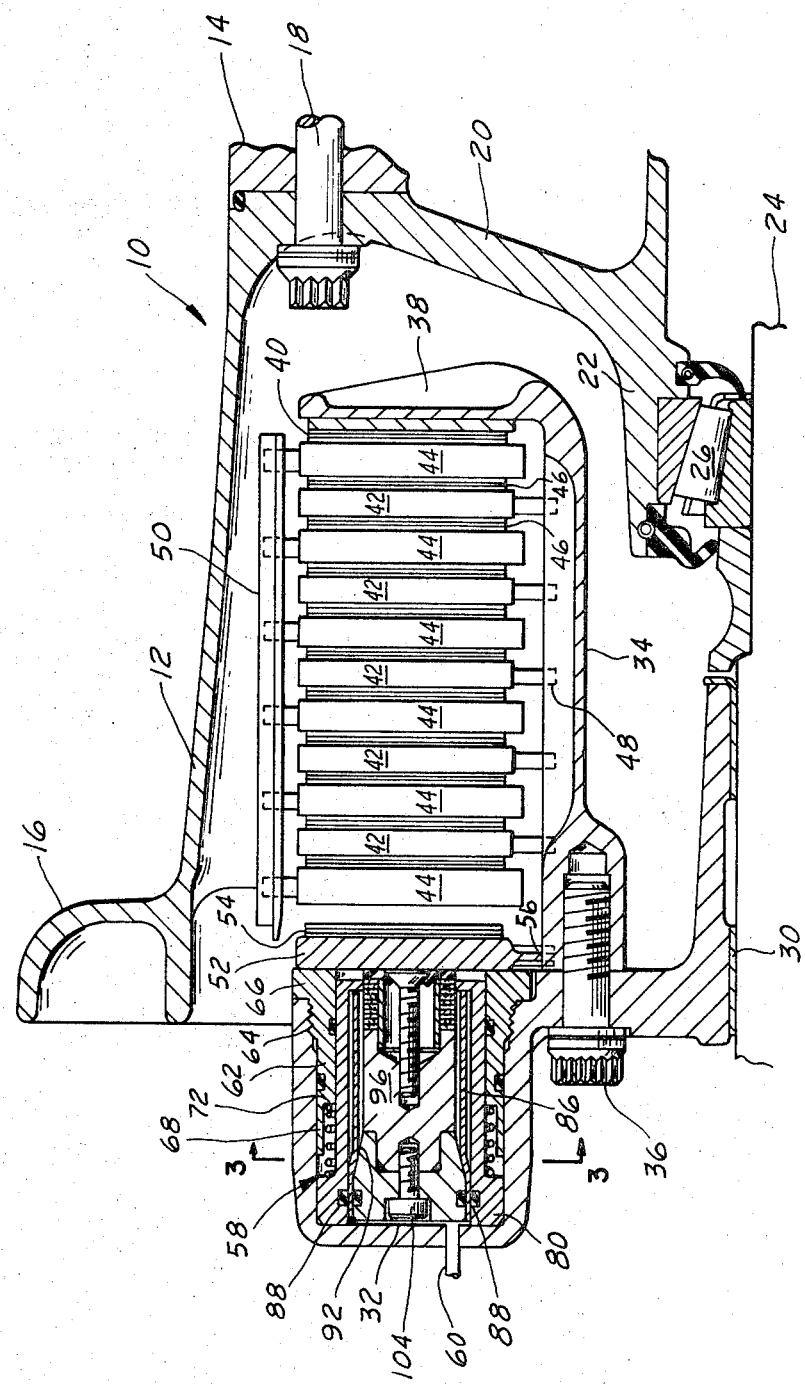
FIG. 1 is a schematic illustration in section of an aircraft wheel and brake embodying the present invention.
Figure 2:
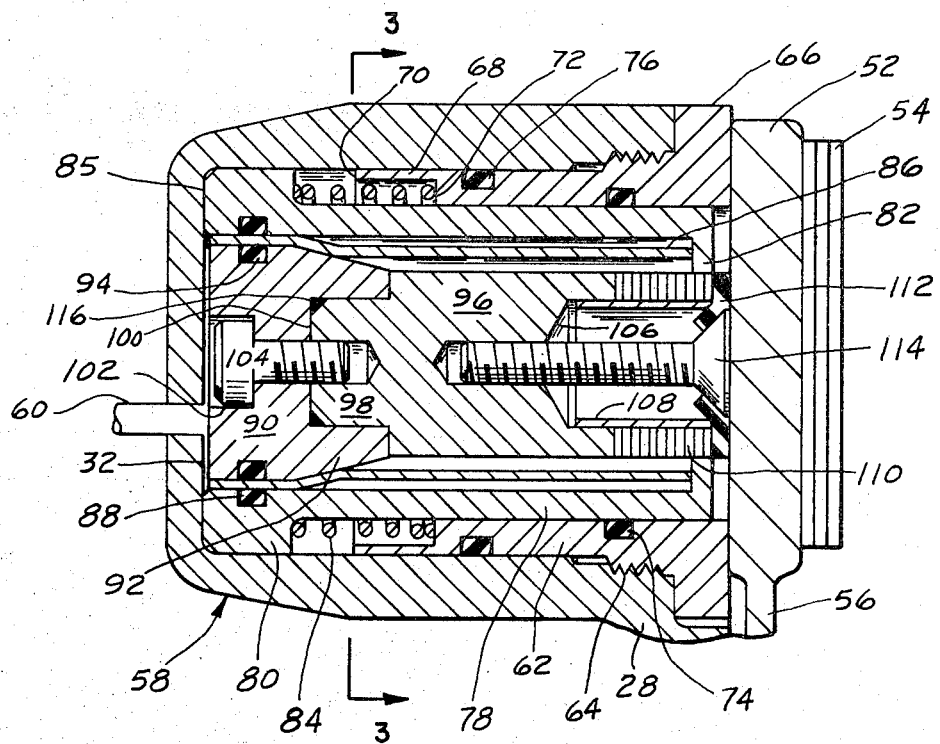
FIG. 2 is a section schematic shown in enlarged form of the present invention removed from the conventional wheel and brake structure of FIG. 1.
Figure 3:
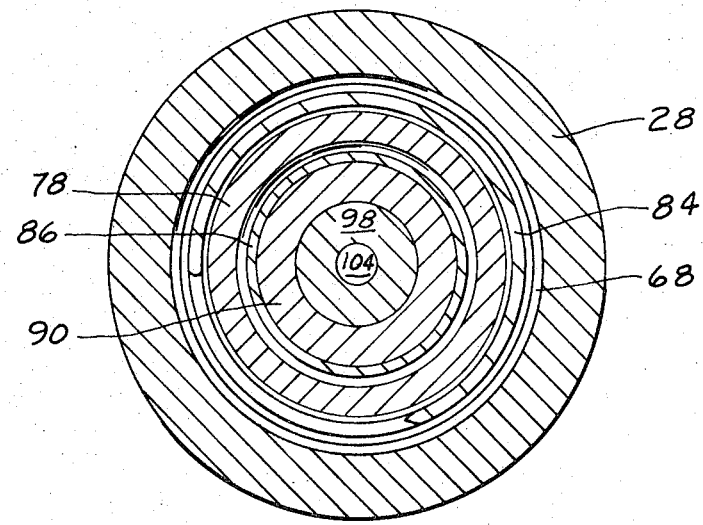
FIG. 3 is a sectional view taken on line 3—3 of FIG. 2.

Referring to the drawings and in particular FIG. 1, numeral 10 designates a conventional aircraft wheel and brake assembly including annular wheel half portions 12 and 14, only one of which is shown in cross section. The wheel portions 12 and 14 are each provided with a tire retaining flange portion 16 for retaining a tire, not shown, thereon. A plurality of circumferentially spaced-apart bolt and nut combinations 18 serve to fixedly secure the wheel portions 12 and 14 together. The wheel portion 12 is provided with integral web portions 20 and a hub portion 22 and is rotatably carried on a fixed axle 24 by conventional bearing means 26 interposed between hub portion 22 and axle 24.

A rotatably fixed annular brake carrier 28 secured to fixed axle 24 by suitable conventional keys or splines 30 is provided with a plurality of circumferentially spaced-apart chambers or cavities 32 only one of which is shown. An annular torque tube 34 is fixedly secured to brake carrier 28 by a plurality of circumferentially spaced-apart bolts 36, only one of which is shown, extending through mating openings in carrier 28 and threadedly engaged with torque tube 34. The torque tube 34 is provided with an integral annular brake backing plate 38 having an annular section of friction material or lining 40 fixedly secured thereto.

A plurality of annular brake stator members 42 are interleaved with a plurality of annular brake rotor members 44. The brake stator members 42 are each provided with lining 46 fixedly secured to opposite sides thereof and are suitably keyed as at 48 for axial movement to torque tube 34. The rotor members 44 are suitably keyed for axial movement to a spline member 50 which, in turn, is fixedly secured to wheel portion 12. The interleaved or stacked rotors 44 and stators 42 are adapted to be compressed together between backing plate 38 and a movable pressure plate 52 to provide the desired braking or retardation of the wheel. The pressure plate 52 has lining 54 fixedly secured thereto and is suitably keyed as at 56 for axial movement to torque tube 34.

The force imposed on pressure plate 52 tending to compress the stator members 42 and rotor members 44 is derived from a plurality of fluid motors or piston assemblies 58 embodying the present invention secured in chambers 32 and responsive to pressurized fluid conducted to chamber 32 via a passage 60 from a conventional operator-controlled fluid pressure source, not shown. The fluid motor assemblies 58 each include an outer bushing 62 having a threaded section 64 engageable with mating threads in carrier 28, a head end 66 having a hexagonal shape or otherwise suitably shaped to receive a wrench and an opposite end portion 68 defining a stop 70 and an annular shoulder 72. The bushing 62 is suitably recessed internally and externally to receive fluid seals such as "O" rings 74 and 76.

An inner bushing or sleeve 78 having a radially outwardly extending annular end portion 80 slidably engaged with the carrier 28 and a radially inwardly extending annular end portion 82. A compression spring 84 interposed between shoulder 72 and annular end portion 80 urges inner bushing 78 away from stop 70 into engagement with a suitable fixed stop 85 as, for example, the end wall of chamber 32.

A cylinder 86 formed of metal or other suitable deformable material is received by inner bushing 78 with one end of cylinder 86 bearing against annular end portion 82 to prevent axial movement of cylinder 86 as will be described. The inner wall of bushing 78 is suitably recessed to receive an "O" ring 88 to thereby provide a fluid seal between adjacent surfaces of bushing 78 and cylinder 86.

A piston 90 slidably received by cylinder 86 has an interference fit therewith and is provided with a tapered portion 92 which bears against cylinder 86. The piston 90 is frictionally secured in cylinder 86 by virtue of the interference fit therebetween which interference fit is overcome by a predetermined force derived from pressurized fluid acting against piston 90 as will be described. The piston 90 is suitably recessed to receive an "O" ring 94 thereby establishing a fluid seal between adjacent surfaces of cylinder 86 and piston 90.

An extension member 96 having a reduced diameter end 98 which extends into a mating recess 100 in piston 90 is fixedly secured to piston 90 which is provided with a central stepped opening 102 through which a bolt 104 extends into threaded engagement with end 98. The opposite end of extension member 96 is recessed as at 106 to receive a sleeve 108 which provides a backing surface for an annular section of suitable heat insulation material 110 extending through the opening defined by end portion 82. The insulation material 110 as well as sleeve 108 is fixedly secured in position on member 96 by a retaining cap 112 having a conical seat for the head of a bolt 114 extending therethrough into threaded engagement with extension member 96. The insulating material 110 provides heat insulation between extension member 96 and cap 112 which bears against pressure plate 52. The end 98 may be chamfered to provide a suitable recess containing on "O" ring 116 or the like which is compressed to provide a fluid seal between surfaces of end 98 and recess 108.

The piston assembly including piston 90, extension member 96, sleeve 108, insulation material 110, and cap 112, is pre-assembled and bolts 104 and 114 tightened to fixedly secure the parts together. The piston assembly with "O" ring 94 therein, is positioned in cylinder 86 and piston 90 forced into cylinder 86 to a predetermined axial position as shown in FIG. 1. The "O" ring 88 is inserted in inner bushing 78 which slidably receives cylinder 86 the end of which abuts end portion 82.

The assembled inner bushing 78 and cylinder 86 with the piston assembly therein is inserted in chamber 32 and compression spring 84 slipped into position thereon. The outer bushing 62 with "O" rings 74 and 76 positioned thereon is inserted into chamber 32 with spring 84 bearing thereagainst and turned with a suitable wrench to fixedly secure outer bushing 62 in position in carrier 28.

The above described assembly procedure may be reversed for disassembly purposes. In this manner assembly or disassembly of the fluid motors 58 relative to carrier 28 may be carried out quickly with relatively few tools.

Assuming the wheel and brake assembly 10 to be operatively mounted on the aircraft, the piston or fluid motor assemblies 58 are energized by pressurized fluid introduced to chambers 32 via passages 60. The pressurized fluid acts against the exposed ends of inner bushing 78, cylinder 86 and piston 90 thereby overcoming the force of spring 84 and urging the end portion 80 into engagement with stop 70. The pressure plate 52 under the influence of piston 90 carried by inner bushing 78 is urged against the stack of rotors and stators 44 and 42 tending to compress the same against backing plate 38 thereby establishing the desired frictional engagement to retard wheel portions 12 and 14.

Wear of the friction lining 40, 46 and/or 54 results in an increase in the axial spacing between the frictionally engageable surfaces which, in turn, must be compensated for if the rotors and stators 44 and 42 are to be fully engaged during brake energization. Assuming that such wear exists, it will be recognized that engagement of end portion 80 with stop 70 will have the effect of limiting travel of piston 90 and thus pressure plate 52 short of that required to cause full engagement of rotors and stators 44 and 42. However, the force derived from the pressurized fluid acting against piston 90 is, in part, imposed radially outwardly against cylinder 86 by virtue of the tapered portion 92 bearing thereagainst. The cylinder 86 is deformed radially outwardly thereby permitting piston 90 to advance axially through cylinder 86 and thus pressure plate 52 toward backing plate 38 to the position necessary to compensate for the wear of the friction lining thereby establishing full engagement of rotors and stators 44 and 42. It will be noted that sufficient clearance is provided between inner bushing 78 and cylinder 86 to permit outward deformation of cylinder 86 as piston 90 advances therethrough. The angle of taper of tapered portion 92 is selected to provide adequate frictional engagement to hold piston 90 in position relative to cylinder 86 at any given position of the piston therein when the pressurized fluid is reduced to release the brake.

The piston 90 and thus pressure plate 52 is retracted a predetermined axial distance upon release of the brake. To that end, a drop in pressure in chamber 38 allows inner bushing 78 carrying cylinder 86 and piston 90 to retract under the influence of spring 84 and abut the end wall of chamber 38 thereby limiting the retraction accordingly to establish a predetermined running clearance between the frictionally engageable surfaces of the brake.

The fluid motor or piston assemblies 58 may be rebuilt for reuse with a minimum of parts replacement thereby reducing cost accordingly. It will be noted that upon disassembly of the piston assembly 58 from the carrier 38 the cylinder 86 with piston 90 and attachments thereto may be removed from inner bushing 78. The piston 90 and attachments thereto are removed from cylinder 86 and inserted in a new cylinder 86 in he heretofore mentioned manner of assembly.

It is readily apparent that applicant's heretofore described brake adjuster apparatus provides a simple, relatively compact and lightweight brake adjuster mechanism capable of compensating for lining wear and retracting the brake to maintain a constant running clearance when the brake is released.

I claim:

1. Brake adjusting apparatus for a brake assembly having a predetermined running clearance and energized by pressurized fluid, said brake adjusting apparatus comprising:

a chamber having a fluid connection with a controlled source of pressurized fluid;

a bushing removably secured in said chamber;
a sleeve member slidably carried by said bushing for axial movement therein;
a first fixed stop engageable with said sleeve member for limiting movement thereof in a brake-applying direction;
a second fixed stop engageable with said sleeve member for limiting movement thereof in a brake release direction;
resilient means urging said sleeve member into engagement with said second stop;
a radially deformable cylinder carried by said sleeve member and movable therewith; and
piston means slidably carried by said cylinder and having an interference fit therewith;
said piston means being responsive to said pressurized fluid and together with said sleeve member movable in a brake-applying direction;
said sleeve member being engageable with said first stop whereupon said piston means is forcibly urged through said cylinder causing radial outward deformation thereof to reposition said piston means axially therein to the extent provided by unwanted brake clearance between frictionally engageable members of the brake;
said pressurized fluid being released to permit retraction of said sleeve member into engagement with said second stop in response to said resilient means to establish a predetermined brake running clearance.

2. Brake adjusting apparatus for a brake assembly as claimed in claim 1, wherein:
said chamber is defined by a carrier member; and
said bushing is threadedly engaged with said carrier member.

3. Brake adjusting apparatus for a brake-assembly as claimed in claim 2, wherein:
said first stop is defined by an axially extending annular portion of said bushing; and
said sleeve is provided with a radially outwardly extending flange engageable with said first stop.

4. Brake adjusting apparatus for a brake assembly as claimed in claim 3 wherein:
said resilient means is a compression spring interposed between said bushing and said flange.

5. Brake adjusting apparatus for a brake assembly as claimed in claim 1, wherein:
said piston means is provided with a radially inwardly tapering portion engageable with said cylinder and operative to deform said cylinder radially outwardly.

6. Brake adjusting apparatus for a brake assembly as claimed in claim 1, wherein:
said sleeve member is provided with a radially inwardly extending end portion defining an opening;
said piston means is provided with a reduced diameter portion including a section of heat insulation material fixedly secured thereto and extending through said opening into engagement with the heat generating frictionally engageable portion of the brake.

7. Brake adjusting apparatus for a brake assembly as claimed in claim 6, wherein:
said cylinder is concentric with said sleeve and engageable at one end with said radially inwardly extending end portion of said sleeve.

8. Brake adjusting apparatus for a brake assembly as claimed in claim 1, wherein:
said piston means is frictionally secured in said cylinder in the absence of said pressurized fluid tending to apply the brake.

* * * * *